(12) United States Patent
Tang

(10) Patent No.: US 12,484,165 B2
(45) Date of Patent: Nov. 25, 2025

(54) ELECTRONIC DEVICE WITH ANTI-DISASSEMBLY MECHANISM

(71) Applicant: Nanning FuLian FuGui Precision Industrial Co., Ltd., Nanning (CN)

(72) Inventor: Zhi-Jie Tang, Nanning (CN)

(73) Assignee: Nanning FuLian FuGui Precision Industrial Co., Ltd., Nanning (CN)

( * ) Notice: Subject to any disclaimer, the term of this patent is extended or adjusted under 35 U.S.C. 154(b) by 133 days.

(21) Appl. No.: 18/620,786

(22) Filed: Mar. 28, 2024

(65) Prior Publication Data

US 2025/0247969 A1 Jul. 31, 2025

(30) Foreign Application Priority Data

Jan. 31, 2024 (CN) .......................... 202410140568.7

(51) Int. Cl.
 H05K 5/02 (2006.01)
 H05K 5/03 (2006.01)
(52) U.S. Cl.
 CPC ............. H05K 5/0208 (2013.01); H05K 5/03 (2013.01)
(58) Field of Classification Search
 None
 See application file for complete search history.

(56) References Cited

U.S. PATENT DOCUMENTS

| 11,124,994 | B2 * | 9/2021 | Jeong | ...................... E05B 81/72 |
| 2023/0064997 | A1 * | 3/2023 | Yang | .................... H05K 5/0208 |
| 2023/0128386 | A1 * | 4/2023 | Wu | .......................... F16B 2/04 |
| | | | | 414/754 |

FOREIGN PATENT DOCUMENTS

| CN | 102858115 A | 1/2013 |
| TW | M275251 U | 9/2005 |
| TW | M499451 U | 4/2015 |
| TW | I692686 B | 5/2020 |
| TW | I693329 B | 5/2020 |

* cited by examiner

Primary Examiner — Xanthia C Relford
(74) Attorney, Agent, or Firm — ScienBiziP, P.C.

(57) ABSTRACT

An electronic device with anti-disassembly mechanism includes a housing, a cover, a frame, a fastening mechanism, a locking element, and a rotation button. The cover is detachably disposed on the housing. The frame is disposed in the housing. The fastening mechanism is disposed on the frame and used for fastening on the cover. The locking element is movably disposed on the frame and used to prevent the fastening mechanism from moving. The rotation button is movably disposed on the frame and used to drive the fastening mechanism. In a locked state, the locking element prohibits the fastening mechanism from moving, and the fastening mechanism is fastened to the cover. When the rotation button is pressed to an unlocked position, the rotation button pushes the locking element to disengage from the fastening mechanism.

15 Claims, 8 Drawing Sheets

ELECTRONIC DEVICE WITH ANTI-DISASSEMBLY MECHANISM

FIELD

The subject matter herein generally relates to electronic devices with anti-disassembly mechanisms.

BACKGROUND

With the development of technology, more electronic products are encountered in our daily lives, and anti-disassembly has become an essential requirement for these electronic products. The anti-disassembly mechanism of the electronic device not only prevents the electronic components in the electronic device from being stolen, but also prevents children from easily removing the battery from the electronic device, thereby causing damage to the electronic device or danger to children.

BRIEF DESCRIPTION OF THE DRAWINGS

Many aspects of the present disclosure are better understood with reference to the following drawings. The components in the drawings are not necessarily drawn to scale, the emphasis instead being placed upon clearly illustrating the principles of the present disclosure. It will be appreciated that for simplicity and clarity of illustration, where appropriate, reference numerals have been repeated among the different figures to indicate corresponding or analogous elements.

DETAILED DESCRIPTION

Figure 1:
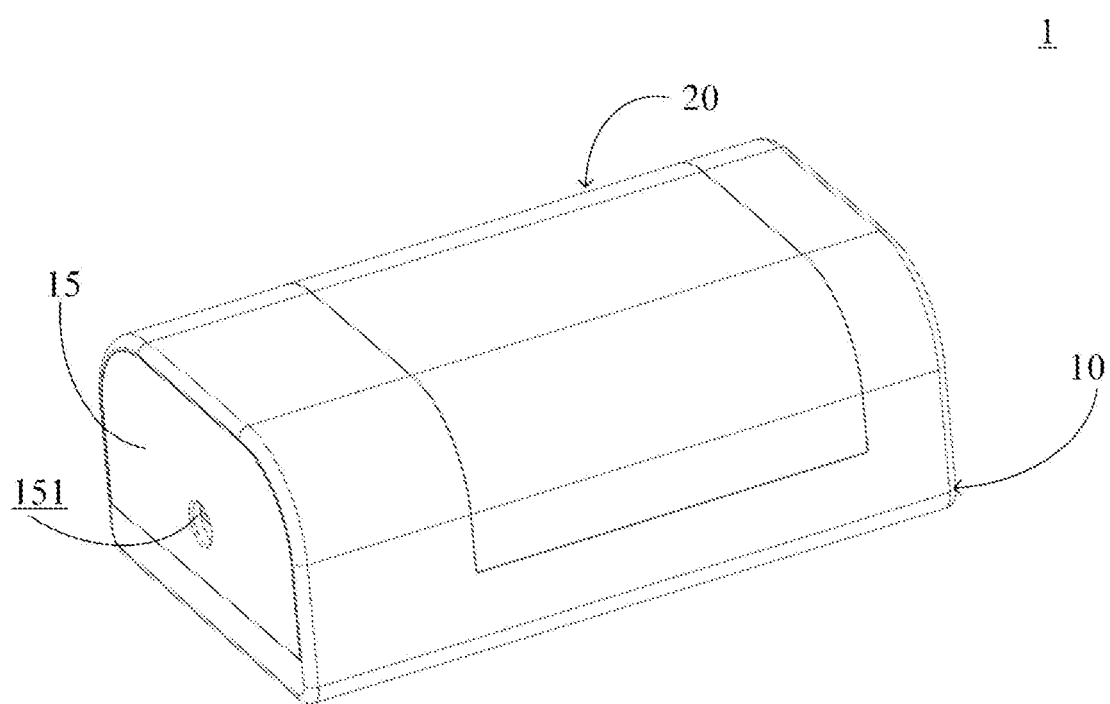
FIG. 1 is a perspective view of an electronic device in accordance with an embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

The disclosure is illustrated by way of embodiments and not by way of limitation in the figures of the accompanying drawings, in which like references indicate similar elements. It should be noted that references to "an" or "one" embodiment in this disclosure are not necessarily to the same embodiment, and such references mean "at least one."

The term "connect" is defined as directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series, and the like.

In the present disclosure, the electronic device includes an anti-disassembly mechanism, which can prevent the electronic device cover from being easily removed from the housing, thereby preventing the electronic components in the electronic device from being easily stolen, and also preventing children from easily being stolen. The present disclosure can also prevent children from easily taking out the battery from the electronic device, thereby causing damage to the electronic device or causing danger to the children.

Figure 2:
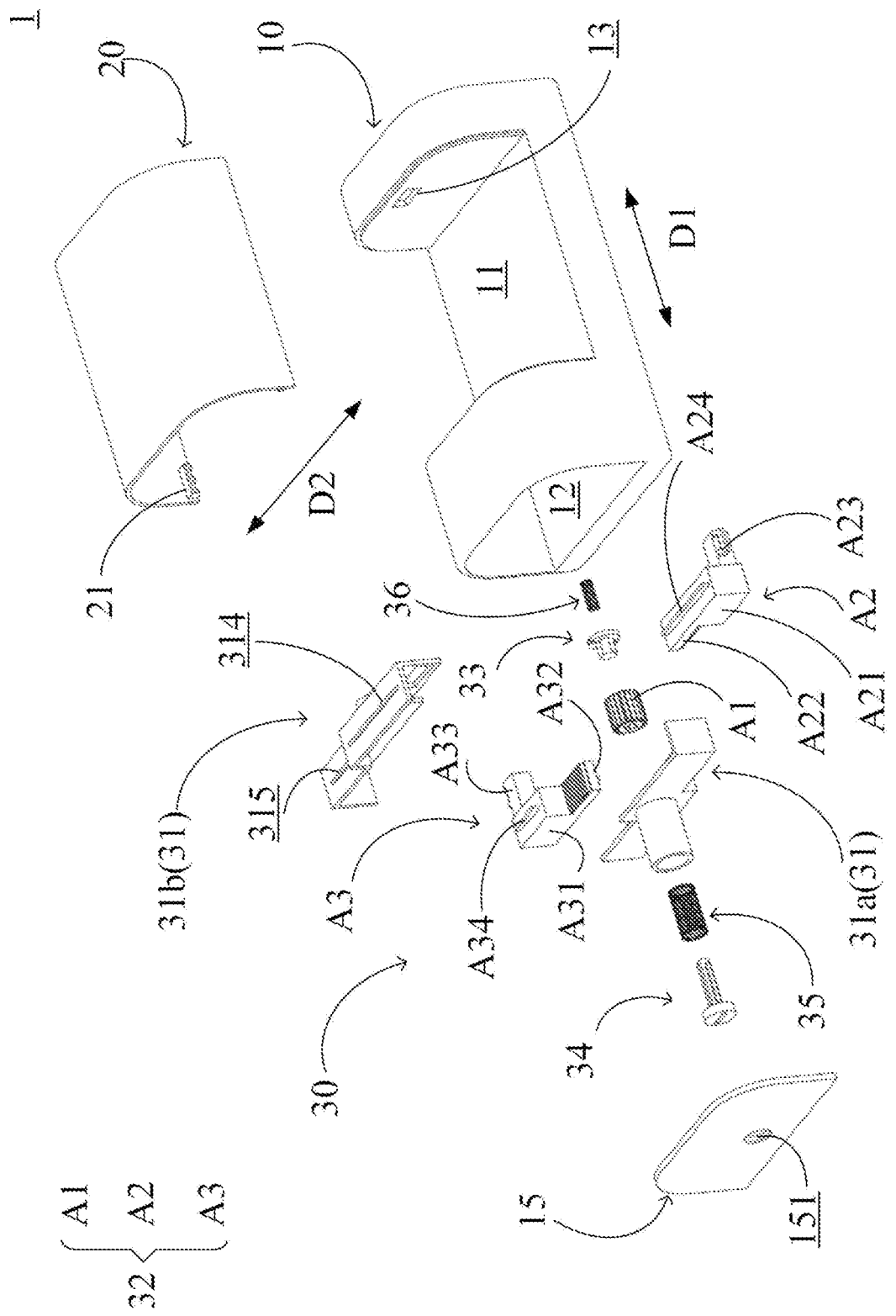
FIG. 2 is an exploded view of the electronic device shown in FIG. 1.
Figure 3:
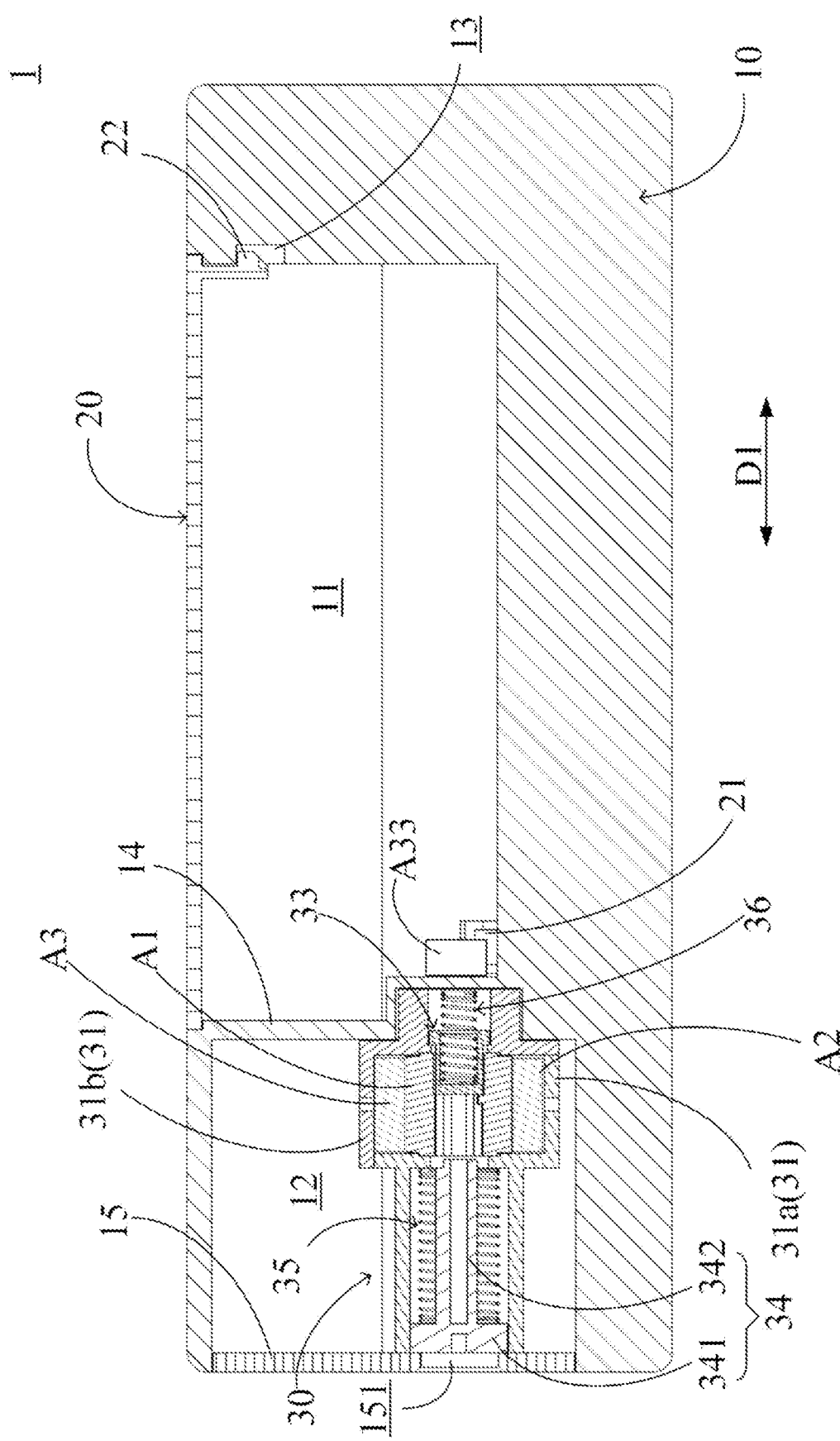
FIG. 3 is a cross-sectional view of the electronic device shown FIG. 1.

FIG. 1 is a perspective view of the electronic device 1 in accordance with an embodiment of the present disclosure. FIG. 2 is an exploded view of the electronic device 1 of FIG. 1. FIG. 3 is a cross-sectional view of the electronic device 1 of FIG. 1. In the embodiment, the electronic device 1 may include various electronic components (not shown). For example, the electronic device 1 may be a battery holder with a control circuit for placing the battery. The battery holder can be installed on an electronic apparatus to provide power to the electronic apparatus.

The electronic device 1 includes a housing 10, a cover 20, and an anti-disassembly mechanism 30. The cover 20 is detachably disposed on the housing 10. The anti-disassembly mechanism 30 is disposed in the housing 10. The anti-disassembly mechanism 30 makes it difficult for the user to simply use a tool to remove the cover 20 from the housing 10.

The housing 10 includes a first receiving groove 11, a second receiving groove 12, and a buckle groove 13. When the electronic device 1 is a battery holder, one or more batteries can be put in the first receiving groove 11. In the embodiment, the housing 10 includes a separation structure 14 and a cover plate 15. The separation structure 14 is between the first receiving groove 11 and the second receiving groove 12, and separated the first receiving groove 11 from the second receiving groove 12. The buckle groove 13 is connected to the first receiving groove 11. The cover plate 15 covers the opening of the second receiving groove 12, is used to prevent the anti-disassembly mechanism 30 away from the second receiving groove 12 of the housing 10. Moreover, the cover plate 15 has an insertion hole 151. The insertion hole 151 is connected to the second receiving groove 12.

The cover 20 is detachably disposed on the housing 10. The cover 20 covers the opening of the first receiving groove 11. The cover 20 includes two first buckles 21 and a second buckle 22. The anti-disassembly mechanism 30 is used to fasten the first buckles 21, and the second buckle 22 is used to fasten the buckle groove 13 of the housing 10. In the embodiment, the numbers of the first buckles 21, the second buckle 22, and the buckle groove 13 are not limited. For example, the cover 20 may include one first buckle 21. The cover 20 may include at least two second buckles 22. The number of the second buckles 22 corresponds to the number of the buckle grooves 13.

Figure 4:
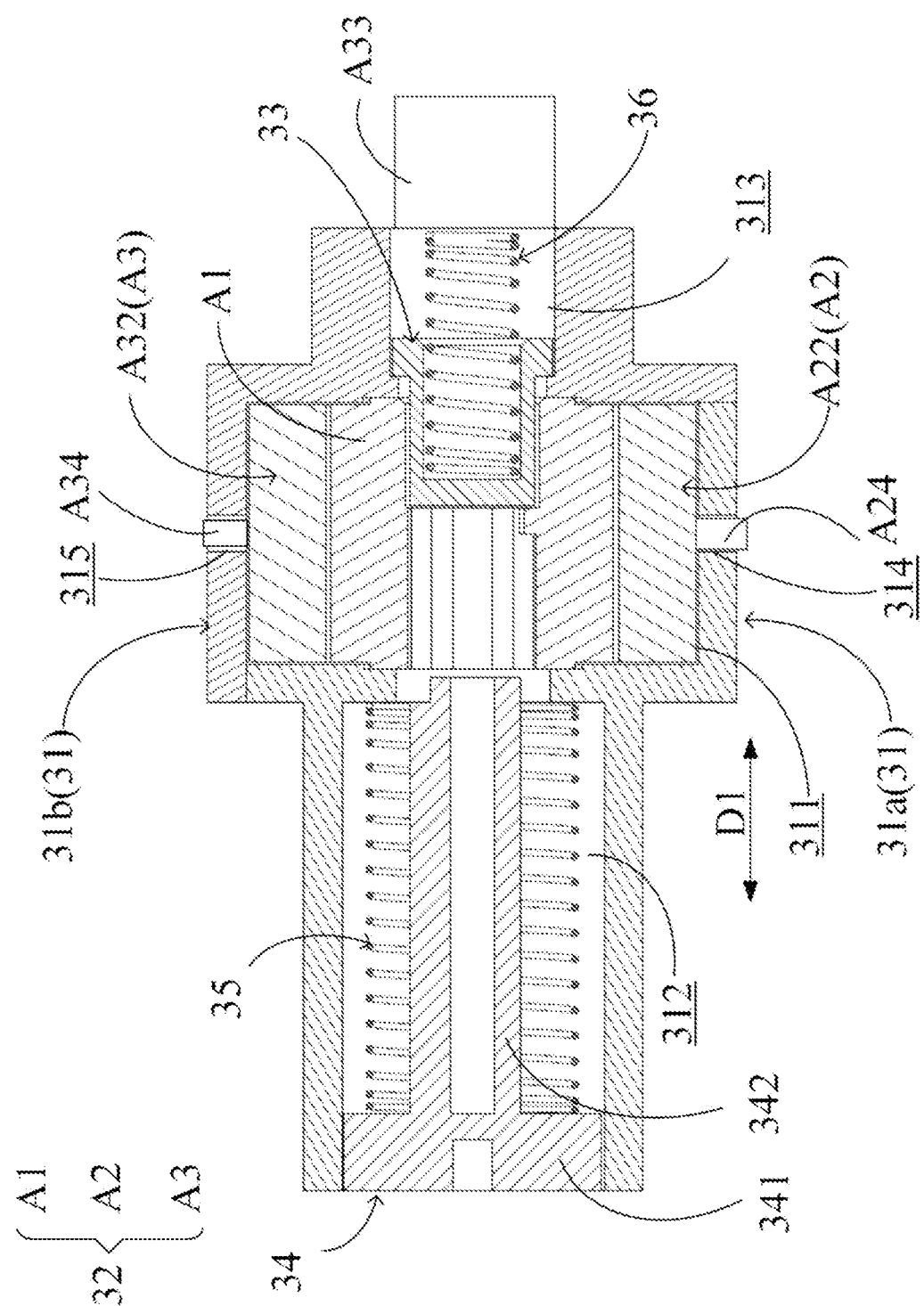
FIG. 4 is a cross-sectional view of an anti-disassembly mechanism shown in FIG. 3.

FIG. 4 is a cross-sectional view of the anti-disassembly mechanism 30 of FIG. 3. The anti-disassembly mechanism 30 is disposed in the second receiving groove 12. The anti-disassembly mechanism 30 includes a frame 31, a fastening mechanism 32, a lock element 33, a rotation button 34, a first elastic element 35, and a second elastic element 36. The frame 31 is disposed in the housing 10, and affixed to the second receiving groove 12. The fastening mechanism 32 is disposed in the frame 31, is used to fasten to the first buckles 21 of the cover 20. The lock element 33 is movably disposed on the frame 31, is used to prevent the fastening mechanism 32 from moving or rotating. The rotation button 34 is movably disposed on the frame 31, and is used to drive the fastening mechanism 32.

The first elastic element 35 abuts to the rotation button 34, and provides an elastic force to the rotation button 34, so that the rotation button 34 is maintained in an initial position as shown in FIG. 3 and FIG. 4. The second elastic element 36 abuts to the lock element 33, and provides an elastic force to the lock element 33, so that the lock element 33 is maintained in a locked position in the fastening mechanism 32 as shown in FIG. 3 and FIG. 4. In the embodiment, the first elastic element 35 and the second elastic element 36 may be springs.

In FIG. 3 and FIG. 4, the electronic device 1 is in a locked state. The fastening mechanism 32 is fastened to the first buckle 21 of the cover 20. The lock element 33 is in the fastening mechanism 32, and prevents the fastening mechanism 32 from moving and/or rotating. The user can press the rotation button 34 to move the lock element 33 away from the fastening mechanism 32, thereby allowing the fastening mechanism 32 to move and/or rotate. Afterwards, the user can rotate the lock element 33 to move/or rotate the fastening mechanism 32 and away from the first buckles 21, thereby releasing the cover 20. At this time, the user can separate the cover 20 from the housing 10.

As shown in FIG. 4, the frame 31 includes a receiving space 311, a first channel 312, and a second channel 313. The receiving space 311 is between the first channel 312 and the second channel 313, and the receiving space 311 is connected to the first channel 312 and the second channel 313. As shown in FIG. 2 to FIG. 4, the end of the first channel 312 is adjacent to or connected to the insertion hole 151 of the cover plate 15. The second channel 313 is adjacent to or connected to the separation structure 14. The first channel 312 and the second channel 313 extend in a movement direction D1, and the receiving space 311 extends in a lock direction in FIG. 2. The movement direction D1 may be perpendicular to the lock direction D2. In the embodiment, the frame 31 includes a first frame 31a and a second frame 31b. The first frame 31a and the second frame 31b are combined to form the receiving space 311. The first channel 312 is in the first frame 31a, and the second channel 313 is in the second frame 31b.

The fastening mechanism 32 is in the receiving space 311. The rotation button 34 is movably disposed in the first channel 312, and corresponds to the insertion hole 151 of the cover plate 15. The cover plate 15 can prevent the rotation button 34 away from the first channel 312. The first elastic element 35 is disposed in the first channel 312, and abuts to the rotation button 34. The lock element 33 is movably disposed in the second channel 313, and the second elastic element 36 is disposed in the second channel 313.

The fastening mechanism 32 includes a gear A1, a first gear rack A2, and a second gear rack A3. The first gear rack A2 and the second gear rack A3 is engaged with the gear A1. When the gear A1 is rotated, the first gear rack A2 and the second gear rack A3 is moved in opposite directions. The first gear rack A2 includes a first body part A21, a first gear portion A22, a first fastening part A23, and a first guide part A24. The first gear portion A22, the first fastening part A23, and the first guide part A24 are connected to the first body part A21. The first gear portion A22 is engaged with the gear A1, and extends in the lock direction D2. The first fastening part A23 extends in the movement direction D1, and passes through the separation structure 14 in FIG. 3. The end of the first fastening part A23 is in the first receiving groove 11, and adjacent to one of the first buckle 21. The first guide part A24 extends in the lock direction D2.

The second gear rack A3 includes a second body part A31, a second gear portion A32, a second fastening part A33, and a second guide part A34. The second gear portion A32, the second fastening part A33, and the second guide part A34 are connected to the second body part A31. The second gear portion A32 is engaged with the gear A1, and extends in the lock direction D2. The second fastening part A33 extends in the movement direction D1, and passes through the separation structure 14 in FIG. 3. The end of the second fastening part A33 is in the first receiving groove 11, and adjacent to one of the first buckles 21. The second guide part A34 extends in the lock direction D2.

The first gear portion A22 of the first gear rack A2 and the second gear portion A32 of the second gear rack A3 are respectively located above and below of the gear A1 in FIG. 4. The first body part A21 and the second body part A31 are located on the opposite sides of the gear A1. When the gear A1 is rotated, the first gear portion A22 and the second gear portion A32 are moved in opposite directions. When the first fastening part A23 and the second fastening part A33 are at the locked position, the first fastening part A23 and the second fastening part A33 are respectively fastened to the two first buckles 21 of the cover 20. When the first fastening part A23 and the second fastening part A33 are at an unlocked position, the first fastening part A23 and the second fastening part A33 are respectively separated from the two first buckles 21 of the cover 20.

The frame 31 further includes one or more first guide grooves 314 and one or more second guide grooves 315. The first guide groove 314 and the second guide groove 315 extend in the lock direction D2. The first guide part A24 is in first guide groove 314, and the second guide part A34 is in the second guide groove 315. The first guide groove 314 and the second guide groove 315 of the frame 31 restrict the first guide part A24 of the first gear rack A2 and the second guide part A34 of the second gear rack A3 from moving in the lock direction D2.

Figure 5:
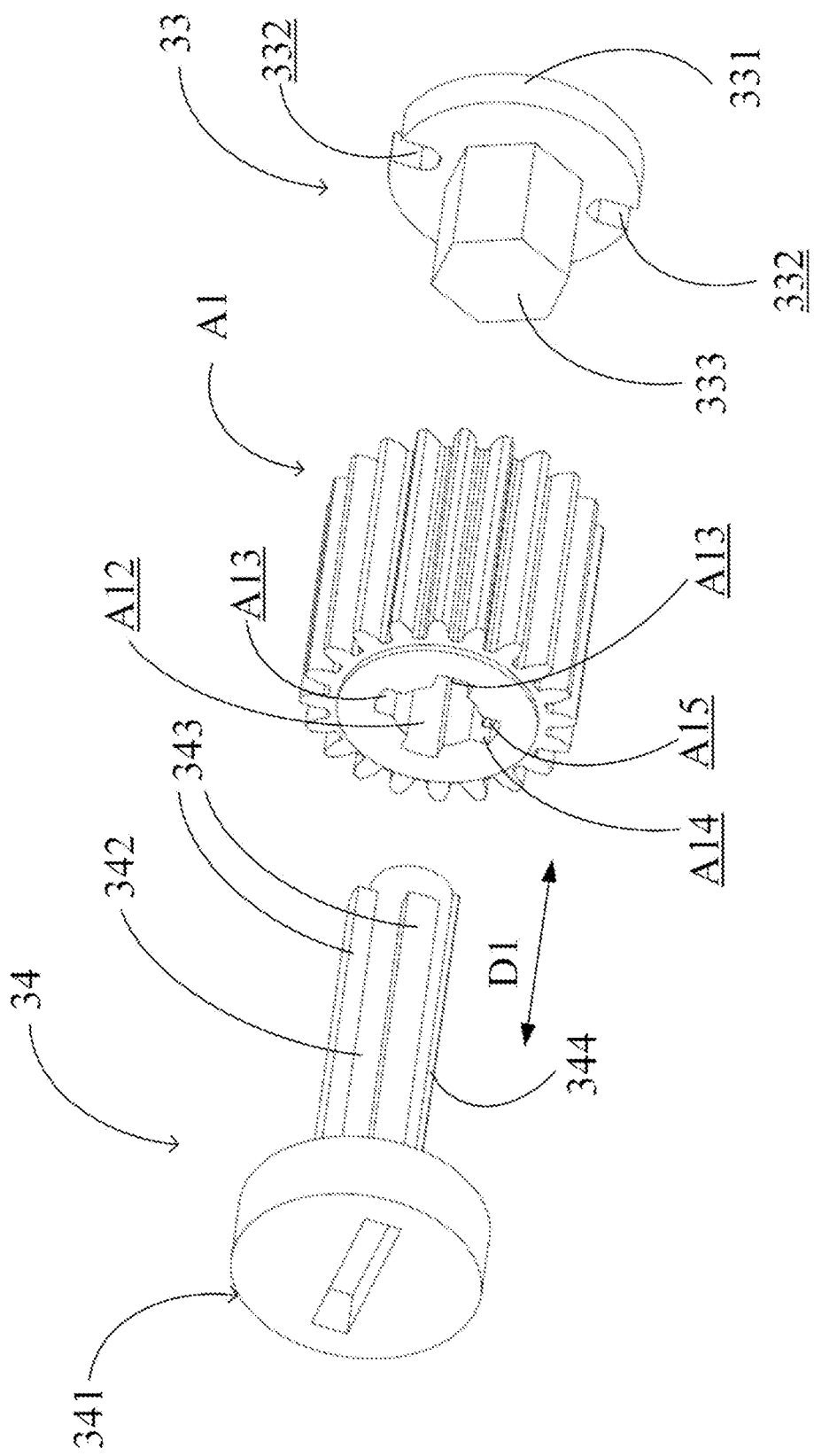
FIG. 5 and FIG. 6 are exploded views of a lock element, a rotation button, and a gear shown in FIG. 2.
Figure 6:
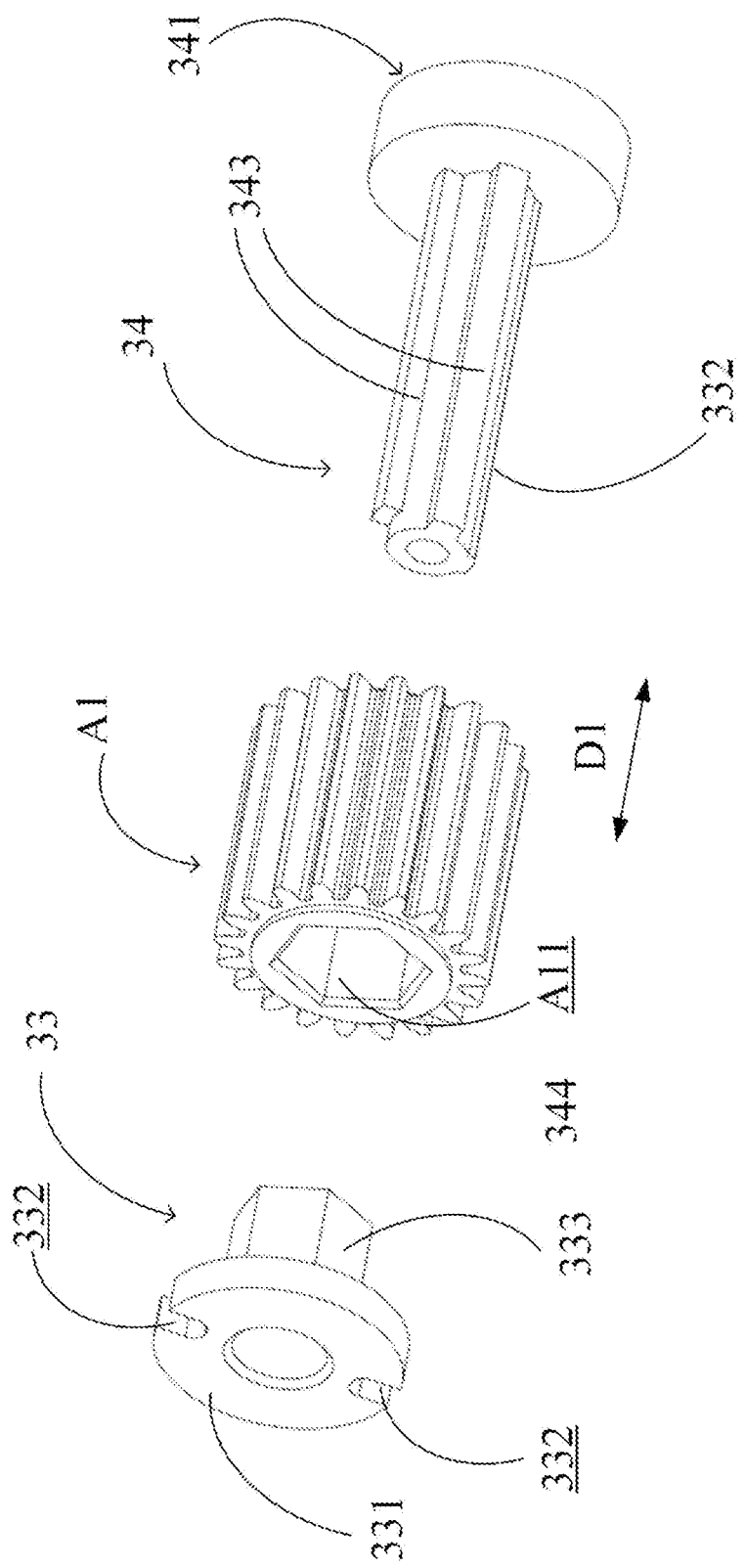

FIG. 5 and FIG. 6 are exploded views of the lock element 33, the rotation button 34, and the gear A1 of FIG. 2. The gear A1 includes a first constraint slot A11, a second constraint slot A12, first position grooves A13, a second position groove A14, and a block portion A15. The first constraint slot A11 and the second constraint slot A12 are located at two opposite sides of the gear A1, and the first constraint slot A11 is connected to the second constraint slot A12. The first position groove A13 and the second position groove A14 are connected to the second constraint slot A12, and block portion A15 is in the second position groove A14.

The lock element 33 includes a first lock portion 331, a second lock portion 333, and restriction grooves 332. The width of the first lock portion 331 corresponds to the width of the second channel 313, and the first lock portion 331 is movably disposed in the second channel 313. The width of the first lock portion 331 and the width of the second channel 313 are measured in the same direction, which is perpendicular to the movement direction D1. The restriction grooves 332 is at the edge of the first lock portion 331. The frame 31 restricts the lock element 33 to move in the movement direction D1 through the restriction groove 332, and prevents the lock element 33 from rotating relative to the frame 31

The second lock portion 333 is connected to the first lock portion 331. The width of the second lock portion 333 corresponds to the width of the first constraint slot A11, and the width of the second lock portion 333 may be less than the width of the first lock portion 331. The width of the first constraint slot A11, the width of the second lock portion 333, and the width of the first lock portion 331 are measured in the same direction, which is perpendicular to the movement direction D1. The second lock portion 333 may be an elongated structure, extending in the movement direction D1. In the embodiment, the cross section of the second lock portion 333 corresponds to the cross section of the first constraint slot A11. Moreover, when the second lock portion 333 is in the first constraint slot A11, the lock element 33 prevents the gear A1 from rotating relative to the lock element 33. The cross section of the second lock portion 333 and the cross section of the first constraint slot A11 may be perpendicular to the movement direction D1.

The rotation button 34 includes a head portion 341, a rod 342, first ribs 343, and a second rib 344. The width of the head portion 341 corresponds to the width of the first channel 312, and the head portion 341 is movably disposed in the first channel 312. The width of the head portion 341 and the width of the first channel 312 can be measured in the same direction, which is perpendicular to the movement direction D1. The rod 342 is connected to the head portion 341. The width of the rod 342 corresponds to the width of the second constraint slot A12, and the width of the rod 342 is less than the width of the head portion 341. The width of the rod 342, the width of the second constraint slot A12, and the width of the head portion 341 can be measured in the same direction, which is perpendicular to the movement direction D1. Moreover, the rod 342 may be an elongated structure, extending in the movement direction D1.

The first ribs 343 and the second rib 344 are disposed on the rod 342. The first ribs 343 and the second rib 344 extend in the movement direction D1. The first ribs 343 is separated from the second rib 344. The thickness of the first ribs 343 relative to the rod 342 is greater than the thickness of the second rib 344 relative to the rod 342. When the first ribs 343 enter the first position groove A13, and the second rib 344 enters the second position groove A14, the rotation button 34 is accessible into the second constraint slot A12 and the first constraint slot A11 through the gear. When one of the first ribs 343 enter the second position groove A14, the block portion A15 blocks the first rib 343, thereby blocking the rotation button 34 from entering into the first constraint slot A11.

As shown in FIG. 1 to FIG. 6, when the electronic device 1 is in a locked state, the second elastic element 36 provides an elastic force to the lock element 33, so that the lock element 33 is maintained in the locked position, and the second lock portion 333 of the lock element 33 is in the first constraint slot A11 of the gear A1. Therefore, the lock element 33 can prevent the gear A1 from rotating relative to the frame 31 and housing 10, thereby prohibiting the first gear rack A2 and the second gear rack A3 from moving relative to the first buckles 21 and being fastened to the first buckle 21. Moreover, since the first fastening part A23 of the first gear rack A2 and the second fastening part A33 of the second gear rack A3 are fastened to the first buckle 21 of the cover 20, and the second buckle 22 of the cover 20 is fastened to the buckle groove of is 13 of the housing 10, so the cover 20 is affixed to the housing 10. In addition, the first elastic element 35 provides elastic force to the rotation button 34, so that the rotation button 34 is maintained at the locked position, and the rotation button 34 is separated from the gear A1.

In another embodiment, when the rotation button 34 is in the locked position, the rod 342 is in the second constraint slot A12, and separated from the first constraint slot A11. Moreover, the first rib 343 and the second rib 344 is separated from the first position groove A13 and the second position groove A14.

Figure 7:
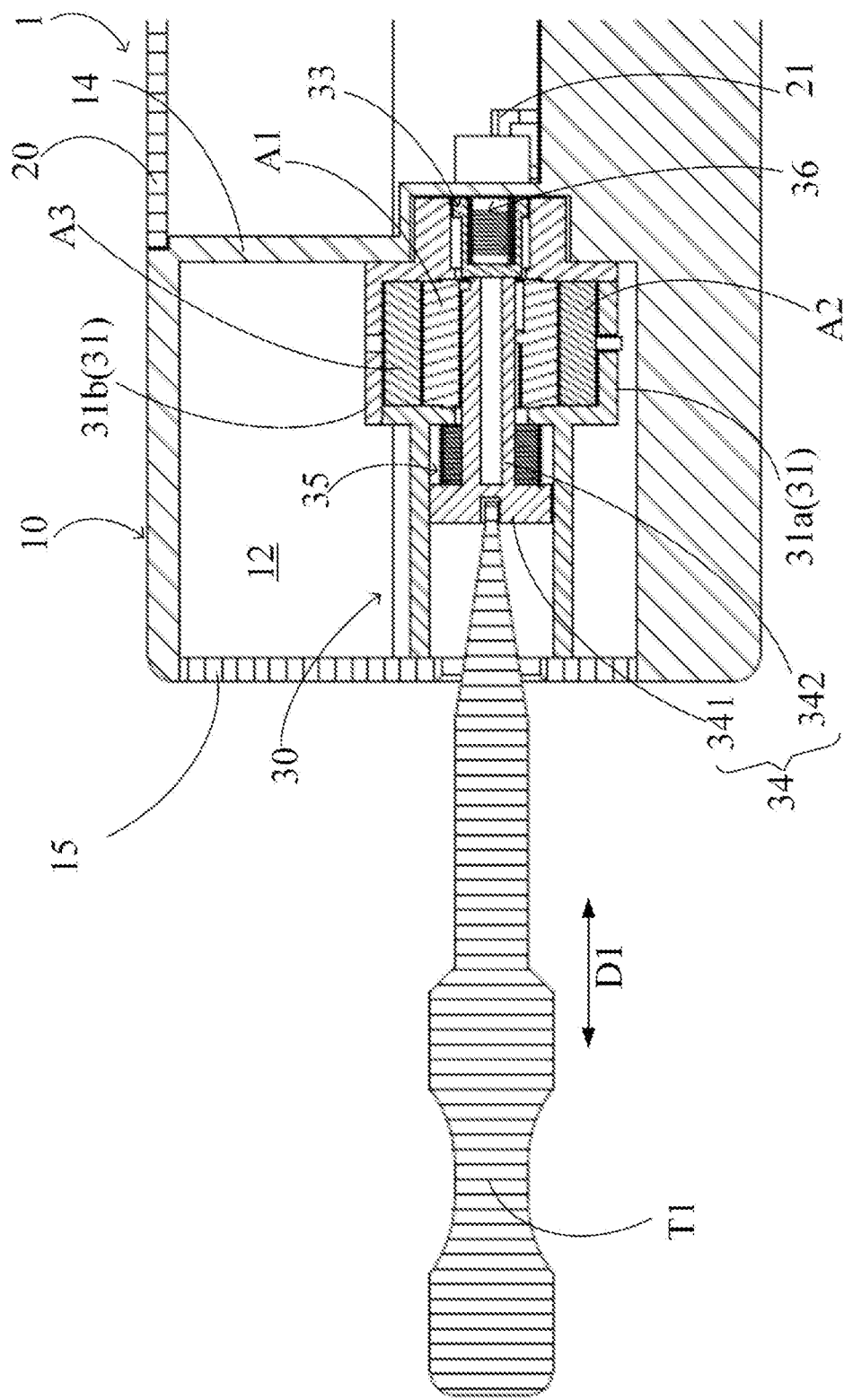
FIG. 7 is a cross-sectional view of the electronic device shown in FIG. 1, wherein the rotation button is pressed to an unlocked position by a tool.

FIG. 7 is a cross-sectional view of the electronic device 1, wherein the rotation button 34 is pressed to an unlocked position by a tool T1. When the user wants to remove the cover 20 from the housing 10, the user uses the tool T1 to pass through the cover plate 15, and rotates and presses the rotation button 34. In the embodiment, after the first rib 343 enters the second position groove A14, the first rib 343 is blocked by the block portion A15, so that the rod 342 of the rotation button 34 cannot enter the first constraint slot A11. Therefore, the user shall try to rotate the rotation button 34 to make the first ribs 343 into the first position grooves A13, and the second rib 344 into the position groove, and then the rotation button 34 can be pressed to the rod 342 into the second constraint slot A12. This increases the difficulty for users to remove cover 20 from housing 10.

In the embodiment, the user needs to further press the rotation button 34, so that the rotation button 34 pushes the lock element 33 away from gear A1 in the movement direction D1, and reaches the unlocked position in FIG. 7. After the rotation button 34 and the lock element 33 reach the unlocked position in FIG. 7, the user can use the tool T1 to rotate the gear A1, thus further increasing the difficulty for the user to remove the cover 20 from the housing 10.

After the rotation button 34 and the lock element 33 reach the unlocked position in FIG. 7, the user is allowed to use tool T1 to rotate gear A1, thus further increasing the difficulty for the user to remove the cover 20 from the housing 10.

Figure 8:
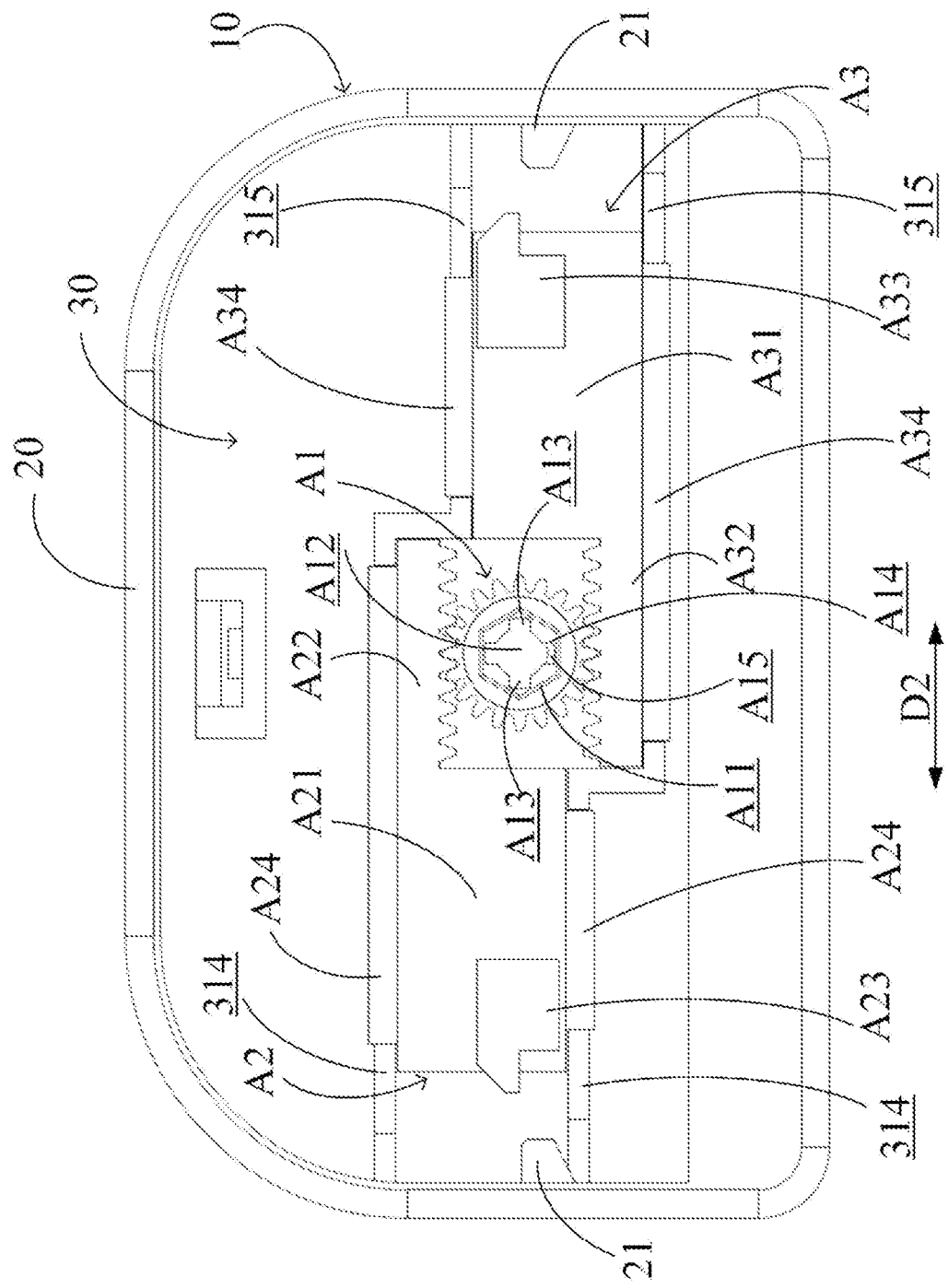
FIG. 8 is a schematic view of the electronic device of the anti-disassembly mechanism, wherein the electronic device is in an unlocked state.

FIG. 8 is a schematic view of the electronic device 1 of the anti-disassembly mechanism 30, wherein the electronic device 1 is in an unlocked state, and the rotation button 34 is not shown in FIG. 8. When the rotation button 34 is in the unlocked position in FIG. 7, the user uses the tool T1 to rotate the gear A1, thereby moving the first gear rack A2 and the second gear rack A3 in opposite directions, and moving the first fastening part A23 of the first gear rack A2 and the second fastening part A33 of the second gear rack A3 respectively away from the first buckles 21 of the cover 20. At this time, the electronic device 1 with the anti-disassembly mechanism 30 is unlocked status, the user can remove the cover 20 from the housing 10.

The anti-disassembly mechanism 30 of the present disclosure can prevent users such as children from easily removing the cover 20 from the housing 10, thereby preventing the electronic device 1 from being damaged. Moreover, the present disclosure prevents children from taking out electronic components inside the cover 20, such as the batteries, thereby causing danger.

Many details are often found in the relevant art, thus many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will, therefore, be appreciated that the embodiments described above may be modified within the scope of the claims.

What is claimed is:

1. An electronic device, comprising:
    a housing;
    a cover detachably disposed on the housing;
    a frame disposed in the housing;
    a fastening mechanism disposed in the frame, and configured to fasten to the cover;
    a lock element movably disposed in the frame, and configured to prevent the fastening mechanism from moving; and
    a rotation button movably disposed in the frame, and configured to drive the fastening mechanism, wherein:
    when the electronic device is in a locked state, the lock element prevents the fastening mechanism from moving, and the fastening mechanism fastens to the cover, and
    the electronic device is in an unlocked position when the rotation button is pressed, to push the lock element away from the fastening mechanism, and the rotation button is then rotated to drive the fastening mechanism to the unlocked position such that the fastening mechanism releases the cover.

2. The electronic device as claimed in claim 1, wherein the frame comprises a receiving space, a first channel, and a second channel,
    wherein the receiving space is between the first channel and the second channel, the fastening mechanism is in the receiving space, the rotation button is movably disposed in the first channel, and the lock element is movably disposed in the second channel.

3. The electronic device as claimed in claim 2, further comprising:
    a first elastic element, disposed in the first channel, and abutting to the rotation button; and
    a second elastic element, disposed in the second channel, and abutting to the lock element.

4. The electronic device as claimed in claim 1, wherein the fastening mechanism comprising:
    a gear comprising a first constraint slot; and
    a first gear rack engaged with the gear,
    wherein in the locked state, the lock element is in the first constraint slot, and the first gear rack is fastened to the cover.

5. The electronic device as claimed in claim 4, wherein the gear further comprises a second gear rack engaged with the gear, and
    when the gear is rotated, the first gear rack and the second gear rack are moved in opposite directions, and the second gear rack is fastened to the cover in the locked state.

6. The electronic device as claimed in claim 5, wherein the first gear rack further comprises a first guide part, the second gear rack further comprises a second guide part, and the frame restricts the first guide part and the second guide part from moving in a lock direction.

7. The electronic device as claimed in claim 5, wherein the first gear rack further comprises a first fastening part, the second gear rack further comprises a second fastening part, and each of the first fastening part and the second fastening part extends in a movement direction, and is fastened to the cover.

8. The electronic device as claimed in claim 5, wherein the first gear rack further comprises a first gear portion, and the second gear rack further comprises a second gear portion, and each of the first gear portion and the second gear portion extends in the lock direction, and is engaged with the gear.

9. The electronic device as claimed in claim 4, wherein the gear further comprises a second constraint slot, and after the rotation button is pressed to the unlocked position, an end of the rotation button extends through the second constraint slot, and pushes the lock element away from the first constraint slot.

10. The electronic device as claimed in claim 9, wherein the gear further comprising a block portion, and the rotation button further comprises a first rib, wherein when the first rib is positioned corresponding to the block portion, the block portion blocks the first rib, thereby blocking the rotation button from entering the first constraint slot.

11. The electronic device as claimed in claim 9, wherein the gear further comprising a first position groove and a second position groove, each of the first position groove and the second position groove is communicating with the second constraint slot, and the gear further comprises a block portion in the second position groove,
    the rotation button comprises a first rib, and the rotation button is accessible into the first constraint slot through the gear when the first rib is in the first position groove, and
    the block portion blocks the first rib, thereby blocking the rotation button from entering into the first constraint slot when the first rib is in the second position groove.

12. The electronic device as claimed in claim 11, wherein the rotation button further comprises a rod and a second rib, and each of the first rib and the second rib is disposed on the rod,
    a thickness of the first rib relative to the rod is greater than a thickness of the second rib relative to the rod, and
    the rod is accessible into the first constraint slot through the gear when the second rib is in the second position groove.

13. The electronic device as claimed in claim 1, wherein the housing comprises a separation structure, a first receiving groove, and a second receiving groove, the separation structure is between the first receiving groove and the second receiving groove, the cover covers an open of the first receiving groove, and the frame is affixed to the second receiving groove.

14. The electronic device as claimed in claim 13, the housing further comprises a cover plate covering an open of the second receiving groove, and the cover plate comprises an insertion hole connected to the second receiving groove, and the rotation button corresponds to the insertion hole of the cover plate.

15. The electronic device as claimed in claim 13, wherein the cover comprises a first buckle and a second buckle, the housing further comprises a buckle groove connected to the first receiving groove, the fastening mechanism is configured to fasten to the first buckle, and the second buckle is configured to fasten to the buckle groove.

* * * * *